United States Patent [19]

Ellwood

[11] 4,059,206

[45] Nov. 22, 1977

[54] EXTRUSION MACHINE HAVING COLLAR FOR SEAL

[75] Inventor: Henry Ellwood, Rochdale, England

[73] Assignee: USM Corporation, Boston, Mass.

[21] Appl. No.: 599,380

[22] Filed: July 28, 1975

[30] Foreign Application Priority Data

Aug. 17, 1974 United Kingdom .............. 36315/74

[51] Int. Cl.² .............................................. B29F 3/04
[52] U.S. Cl. ..................................... 222/413; 222/564; 425/311
[58] Field of Search ............... 222/412, 413, 478, 485, 222/564; 425/307, 311, DIG. 230, 564, 192, 382 R, 382 N; 18/12 SE

[56] References Cited

U.S. PATENT DOCUMENTS

| 2,469,999 | 5/1949 | Stober | 18/12 SE |
|---|---|---|---|
| 2,958,099 | 11/1960 | Chisholm et al. | 18/12 SE |
| 3,000,618 | 9/1961 | Oakes | 18/12 SE |
| 3,214,796 | 11/1965 | Ginaven | 425/DIG. 230 |
| 3,458,902 | 8/1969 | Burns | 425/192 X |
| 3,847,531 | 11/1974 | McComb | 425/311 X |

Primary Examiner—Robert B. Reeves
Assistant Examiner—David A. Scherbel
Attorney, Agent, or Firm—Vincent A. White; Richard B. Megley; Donald N. Halgren

[57] ABSTRACT

An extruder having a screw rotatable in a chamber provided with an annularly perforated end wall through which plastic material is extruded, the end of the screw being provided with a collar urged against the central portion of the wall to exclude the material therebetween.

2 Claims, 1 Drawing Figure

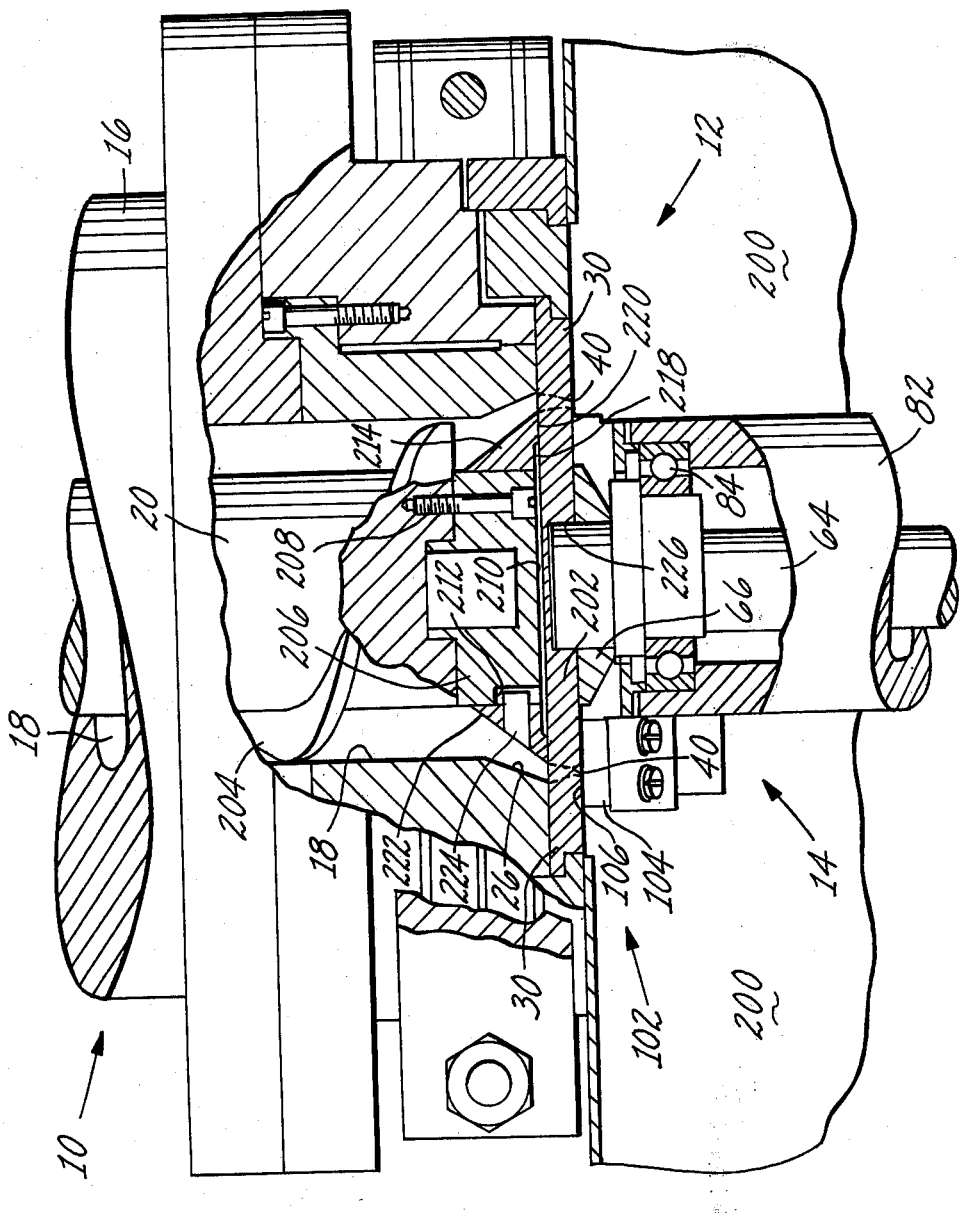

EXTRUSION MACHINE HAVING COLLAR FOR SEAL

BACKGROUND OF THE INVENTION

It is known to make pellets of plastics material by melting the material and forcing the molten material through holes in a die member into a region where the plastics material is cooled to cause it to solidify, the cooled strands of extruded material being severed by cutting means, to form pellets. A known machine for carrying out this method comprises a cylindrical extrusion chamber in which an extrusion screw is mounted for rotation, a die member such as a pellet plate forming a wall across one end of the extrusion chamber. Plastic material to be pelletized is supplied to the chamber at one end and is plasticized by rotation of the extrusion screw (and, if necessary, application of a controlled quantity of heat), the screw forcing the molten plastics material through holes in the die plate at the other end of the chamber. In such a machine the cutting means may conveniently comprise a rotating knife which runs on a front face of the die plate to sever the plastics material extruded through the holes therein. In a known machine the die holes are disposed in an annular portion of the pellet plate, a central portion of which is supported by means disposed outside the extrusion chamber against displacement by pressure of plastics material in the extrusion chamber. A cone torpedo coaxial with the screw is secured to the central portion of the pellet plate to assist flow of molten plastics material towards the perforated annular portion of the pellet plate. It has been found that a stagnant region tends to form at the end of the extrusion screw, and material entering this stagnant region becomes overheated. Where the material is a straightforward thermoplastics material, overheating causes the material to degrade. Bits of the degraded material from time to time enter the flow of plastics towards the holes in the pellet plate and block the holes and/or cause the pellets of plastics material produced to be of an inferior quality. Where the plastics material being processed is a thermosetting type of material, (that is, material which can in its uncured state be rendered molten by the application of a controlled quantity of heat but which upon application of heat beyond this controlled quantity sets to a hard condition in which application of heat cannot melt the material) it has also been found that cured material tends to build up at the end of the screw to such an extent that flow of molten material to the holes in the die plate is severely restricted or even blocked altogether.

OBJECTS OF THE INVENTION

One of the various objects of the present invention is to provide an improved extrusion machine which is not subject to the above objections.

To this end, an extrusion machine illustrative of the invention comprises an extrusion chamber having a pellet plate forming a wall across one end of the chamber. The pellet plate is provided with a plurality of holes leading from the extrusion chamber in an annular portion of the plate bounding a circular central portion of the plate. An extrusion screw is mounted for rotation in the extrusion chamber to urge extrudable material (for example such as thermo-setting plastics material e.g. uncured phenolic resin) towards the pellet plate and to extrude the molten plastics material through the holes in the plate. A collar is slidably mounted on a block on the front end of the screw, spaced slightly from a rear face of the central portion of the pellet plate.

In the operation of the machine a bearing portion of a front face of the collar is urged against the central portion of the pellet plate to prevent ingress of material between the front face of the block and the central portion of the pellet plate. Should any molten plastics material enter this region, it is trapped and cannot escape to interfere with the operation of the illustrative machine.

According to one feature, the collar is urged against the central portion of the member by pressure of extrudable material in the extrusion chamber acting on the collar to push the collar against the central portion of the member and form a seal. Preferably the collar is made of steel with a bronze facing bearing on the central portion of the die member. Alternatively however, the collar may be made of any other suitable material, for example by molding, e.g. phenolic resin. Where a collar is molded of phenolic resin a new collar may be fitted for each production run.

Whereas the illustrative machine is particularly suitable for use with reactive, thermo-setting plastics materials, it may also be used for extruding a variety of plastics materials and for extruding rubber compounds.

The above and other of the various objects and several features of the present invention will become more clear from the following description to be read with reference to the accompanying drawing of an illustrative machine. It will be realized that the pelletizing machine described has been selected to illustrate the invention by way of example and not of limitation of the invention.

The accompanying drawing is a view of part of the illustrative machine, partly in section and with parts broken away.

The illustrative pelletizing machine comprises a plasticator portion 10, an extrusion head 12, and a cutter assembly 14. The plasticator portion 10 comprises a barrel portion 16 in which is formed a cylindrical extrusion chamber 18 leading to a frusto-conical front end portion 26 which flares outwardly towards a pellet plate 30 which forms a wall across a front end of the extrusion chamber. A plurality of extrusion holes 40 are formed through an annular portion of the pellet plate 30 leading from the extrusion chamber 18 to a collector chamber 200. The annular portion of the pellet plate 30 bounds a circular central portion 202 of the plate.

An extrusion screw 20 coaxial and rotatable in the chamber 18 is provided with a screw flight 204. A front end portion of the screw has a cylindrical block 206 secured thereto by screws 208. However, the block 206 rather than being a separate secured part could be machined from the screw body without departing from the scope of the invention. A front face 210 of the block 206 is parallel with and spaced slightly from a rear face of the pellet plate 30. Three keyways 212 (only one visible in the drawing) are formed in the outer surface of the block running parallel with and spaced equi-angularly about the axis of rotation of the screw 20.

A frusto-conical collar 214 is mounted on the block 206 for sliding movement axially of the screw. The collar further comprises a front face comprising an inner annular portion 218 spaced slightly from the rear face of the pellet plate 30 and an outer annular bearing portion 220 which, in the operation of the illustrative machine, is in engagement with the rear face of the pellet plate 30. When the bearing portion 220 of the collar 214 is in contact with the rear face of the pellet plate 30, the outermost edge of the front face of the collar 214 coincides with the circular boundary between the central portion 202 of the pellet plate 30 and the annular portion of the pellet plate 30 in which the holes 40 are formed. An outer surface 222 tapers rearwardly from the outer edge of the bearing portion 220 to a rear edge which meets the collar 214. The collar is provided with keys 224 which project into keyways 212 in the block 206 so the collar rotates with the screw. By engagement with rear faces of the keyways 212, the keys also limit the rearward movement of the collar 214 so that the rear edge of the collar cannot move rearwardly of the junction between the block 206 and the main body of the screw 20. The outer surface 222 of the collar and the portion 26 of the extrusion chamber form an annular passage of decreasing cross-sectional area as it extends toward the pellet plate 30. As shown, the holes 40 are arranged within the annular portion of the pellet plate 30 at the end of the above annular passage and may either be concentrically arranged or staggered.

The cutter assembly 14 comprises a tubular member 64 which extends between a recess 226 in a front face of the central portion 202 of the pellet plate, and a bridge member (not shown) of the illustrative machine. The member 64 acts to support the central portion of the pellet plate. A washer 66 acts to spread the load over the central portion of the pellet plate. The tubular member 64 is coaxial with the extrusion screw 20. In the operation of the illustrative machine when material is being extruded by the screw 20 through the holes 40 in the pellet plate, pressure of material against the pellet plate 30 tends to force the pellet plate outwardly. The supporting load applied by the tubular member 64 is selected to be such that in the operation of the illustrative machine the pellet plate is substantially flat.

A sleeve 82 is mounted for rotation on front bearings (not shown) and rear bearings 84 carried by the tubular member 64. The axis about which the sleeve 82 rotates is parallel with the axis of rotation of the extrusion screw 20 but is offset slightly therefrom for a reason which will become apparent hereinafter. A motor (not shown), in the operation of the illustrative machine rotates the sleeve member 82. Cutting means 102 comprising two knife assemblies is mounted on a rear end portion of the sleeve 82. Cutting blades 104 of the knife assemblies are mounted at opposite sides of the axis of rotation of the sleeve 82 with cutting edges 106 of the blades lying parallel. The cutting edges of the blades 104 of the knife assemblies are spring-urged into contact with the front face of the pellet plate 30. Passage means (not shown) are provided in the sleeve member 82 for supplying air under presssure and at atmospheric temperature to outlet ducts (not shown) carried by the sleeve member 82 which direct the air, in the operation of the machine, towards the cutting edges 106 of the cutting blades 104, the stream of air flowing substantially along the cutting edge to cool the blades. In the operation of the machine, as the sleeve 82 is rotated, the blades 104 are moved in an annular path. The degree by which the axis of rotation of the sleeve member 82 is offset from the axis of rotation of the screw 20 is chosen to be such that the annular portion of the pellet plate 30 in which the holes 40 lie intersects the cutting edges 106 at a variety of positions so that the cutting edge is substantially equally worn along the whole of its length.

The collar 214 of the illustrative machine preferably is steel with a bronze annular bearing portion 220. However, the collar may be molded of any suitable material, for example phenolic resin. Where a molded collar is used a new collar may be fitted for each production run and the user of the machine may mold the collars himself.

In the operation of the illustrative machine extrudable material to be pelletized, for example a thermo-setting resin e.g. a phenolic resin, is fed in known manner to a rear end portion of the cylindrical portion 18 of the extrusion chamber and the screw 20 is rotated to force the extrudable material forwardly along the cylindrical portion 18 and through the annular passage between the frusto-conical portion 26 of the extrusion chamber and the outer surface 222 of the collar 214, the pressure generated by rotation of the screw 20 forcing the extrudable material through the holes 40. The pressure of the extrudable material being forced along the extrusion chamber by rotation of the screw 20 acts on the outer surface 222 of the collar 214 to slidably force the collar forwardly, on the block 206. The annular bearing portion 220 of the front face of the collar 214 is thus forced firmly into sealing engagement with rear face of an outer part of the central portion 202 of the pellet plate 30 thereby preventing leakage of the extrudable material into the gap between the front face 210 of the screw and the rear face of the pellet plate 30. Any changes in relative position of the front face 210 of the screw 20 and the rear face of the pellet plate 30, for example caused by changes in temperature or pressure of extrudable material, do not affect the seal made by the collar 214 against the rear face of the pellet plate 30 because the collar 214 is able to slide on the block 206, parallel with the axis of rotation of the screw 20, to accommodate any such differences. Should material being extruded leak between the collar 214 and the rear face of the pellet plate 30 into the region between the front face 210 of the screw 20 and the rear face of the pellet plate 30, the material leaking will be trapped and cause no harm to the rest of the extruded material. The inner surface of the collar is a sufficiently close fit on the block 206 to prevent entry of any substantial quantity of extrudable material into the gap between the collar 214 and block 206; any small amount of material entering this gap rapidly cures and acts as a seal. As the extrudable material is extruded through the holes 40 by pressure of the extruder screw 20, the sleeve 82 is rotated causing the cutting means 102 to be rotated and thereby sever the material extruded through the holes 40 to form pellets which are flung into the collector chamber 200 and carried away in a stream of air at room temperature to cooling apparatus.

When forming pellets of thermo-setting materials, for example phenolic resin, it is important to avoid heating the material to a temperature which will initiate the setting reaction. The use of a low extrusion rate (per hole) and a thin pellet plate ensures that the temperature rise in the plastics material as it passes through the holes 40 is small. Furthermore the use of cooling air directed through the ducts in the sleeve member 82 towards the cutting edges 106 of the blades 104 helps to cool the blades so that the temperature of the extruded material is not raised above its curing point by contact with the cutting blades and, further, the stream of cool air flowing through the collecting chamber over the pellet plate and other parts of the illustrative machine helps to maintain a temperature in the material below its curing temperature. Because there are no "dead-spots" in the extrusion chamber of the illustrative machine, there is little or no chance of material curing or degrading, in the extrusion chamber or in the holes 40, which would cause blocking of the holes 40 and/or produce a pelletized product of inferior quality.

It should be apparent from the foregoing description that a variety of materials may be processed in the machine. Furthermore, parts of a variety of materials could be substituted for those described without departing from the scope of the invention defined by the following claims.

I claim:

1. A plastic extrusion machine having a screw rotatable in a chamber for plasticating and transporting plastic material, an annularly perforated wall at one end of the chamber through which material is extruded, a collar slidable on the end of the screw against a central portion of the wall in response to movement of material in the chamber toward said wall forming a seal to prevent ingress of the material into a stagnant area between the end of the screw and the wall.

2. A machine according to claim 1 in which the collar is frusto-conical and arranged so the material being forced toward the perforated wall forces the collar against the wall.

* * * * *